(12) United States Patent
Gollapudi

(10) Patent No.: US 8,583,667 B2
(45) Date of Patent: *Nov. 12, 2013

(54) LARGE GRAPH MEASUREMENT

(75) Inventor: Sreenivas Gollapudi, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/314,555

(22) Filed: Dec. 8, 2011

(65) Prior Publication Data

US 2012/0078927 A1 Mar. 29, 2012

Related U.S. Application Data

(63) Continuation of application No. 12/396,514, filed on Mar. 3, 2009, now Pat. No. 8,090,729.

(51) Int. Cl.
*G06F 17/30* (2006.01)
*G06F 7/00* (2006.01)

(52) U.S. Cl.
USPC .......................... 707/755; 707/756; 707/780

(58) Field of Classification Search
None
See application file for complete search history.

(56) References Cited

U.S. PATENT DOCUMENTS

| | | | |
|---|---|---|---|
| 7,188,106 B2 | 3/2007 | Dwork et al. | |
| 8,194,655 B2 * | 6/2012 | Pister | 370/389 |
| 2003/0033582 A1 | 2/2003 | Klein et al. | |
| 2007/0239694 A1 | 10/2007 | Singh et al. | |
| 2008/0275899 A1 * | 11/2008 | Baluja et al. | 707/102 |
| 2009/0132561 A1 * | 5/2009 | Cormode et al. | 707/100 |
| 2010/0125594 A1 * | 5/2010 | Li et al. | 707/758 |

OTHER PUBLICATIONS

Andersen, et al., "Drawing Power Law Graphs using a Local/Global Decomposition", Retrieved at <<http://www.math.sc.edu/~lu/papers/draw.pdf>>, Proceedings of the Twelfth Annual Symposium on Graph Drawing, 2004, pp. 1-16.

Gleich, et al., "Approximating Personalized PageRank with Minimal Use of Webgraph Data", Retrieved at <<http://www.stanford.edu/~dgleich/publications/appr-submitted.pdf>>, pp. 1-28.

"Approximate Nearest-Neighbors in High-Dimensional Metric Spaces", Retrieved at <<http://www.kavrakilab.org/robotics/Proximity>>, pp. 3.

McGregor, Andrew, "Graph Mining on Streams", Retrieved at <<http://www.cs.umass.edu/~mcgregor/papers/08-graphmining.pdf>>, pp. 1-5.

(Continued)

*Primary Examiner* — Kuen Lu
(74) *Attorney, Agent, or Firm* — Microsoft Corporation

(57) ABSTRACT

As provided herein, a pairwise distance between nodes in a large graph can be determined efficiently. URL-sketches are generated for respective nodes in an index by extracting labels from respective nodes, which provide a reference to a link between the nodes, aggregating the labels into sets for respective nodes, and storing the sets of labels as URL-sketches. Neighborhood-sketches are generated for the respective nodes in the index using the URL-sketches, by determining a neighborhood for a node and generating a sketch using labels that are associated with the respective neighboring nodes. A distance between two nodes is determined by computing an approximate number of paths and an approximate path length between the two nodes, using the neighborhood sketches for the two nodes.

20 Claims, 9 Drawing Sheets

(56) References Cited

OTHER PUBLICATIONS

Najork, et al., "Less is More: Sampling the Neighborhood Graph Makes SALSA Better and Faster", Retrieved at <<http://research.microsoft.com/pubs/75807/wsdm2009.pdf>>, WSDM 2009, Barcelona, Spain, pp. 10.

Gavoille, et al., "Distance Labeling in Graphs", Retrieved at <<http://www.wisdom.weizmann.ac.il/~ranraz/publications/Plabeling.pdf>>, Journal of Algorithms 53, 2004, pp. 85-112.

Thorup, et al., "Approximate Distance Oracles", Retrieved at <<http://citeseerx.ist.psu.edu/viewdoc/download;jsessionid=60A39510B9396285321791BE466A47B0?doi=10.1.1.6.4034&rep=rep1&type=pdf>>, STOC'01, Jul. 6-8, 2001, Hersonissos, Crete, Greece, pp. 10.

Katz et al., "Distance Labeling for Flow and Connectivity", Retrieved at <<http://delivery.acm.org10.1145/550000/545502/p927-katz.pdf?key1=545502&key2=054412332&coll=GUIDE&dl=GUIDE&CFID=20120585&CFTOKEN=83837444>>, pp. 927-936.

Gollapudi, et al., "A Dictionary for Approximate String Search and Longest Prefix Search", Retrieved at <<http://portal.acm.org/ft_gateway.cfm?id=1183723&type=pdf&coll=GUIDE&dl=GUIDE&CFID=19558538&CFTOKEN=45564675>>, CIKM'06, Nov. 5-11, 2006, Arlington, Virginia, USA, pp. 768-775.

Broder et al., "Min-wise Independent Permutations", Retrieved at <<http://deliery.acm.org/10.1145/280000/276781/p327=broder.pdf?key1=276781&key2=636412332&coll=GUIDE&dl=GUIDE&CFID=19558634&CFTOKEN=19204490>>,STOC'98 Dallas, Texas, USA, pp. 327-336.

Jeh et al., "Scaling Personalized Web Search", Retrieved at <<http://infolab.stanford.edu/~glenj/spws.pdf>>, pp. 1-35.

Notice of Allowance cited in related U.S. Appl. No. 12/396,514 dated Aug. 23, 2011.

\* cited by examiner

LARGE GRAPH MEASUREMENT

RELATED APPLICATIONS

This application is a continuation of U.S. application Ser. No. 12/396,514, filed on Mar. 3, 2009, entitled "LARGE GRAPH MEASUREMENT", at least some of which may be incorporated herein.

BACKGROUND

Large graphs may comprise a series of nodes that are linked by a notion of similarity. For example, a web-graph may comprise an index of web-pages with respective links between the nodes comprising a notion of similarity, such as a domain, universal resource locator (URL), or content. As another example, people in social networks may make up nodes in a graph having links comprising particular interests or group memberships.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Given a large graph, such as a web-graph or messenger graph, one may wish to identify a distance (e.g., how close or how far away) between two nodes in the graph, where the distance is a function of similarity. Distance between nodes in a large graph may play important roles in determining similarities between two web-pages in an index, such as a search engine database, for example. Computing a precise distance, such as a connectivity (e.g., number of paths) between nodes, can be difficult, taking a lot of time and utilizing a large amount of computing resources.

Often a precise distance may not be needed, particularly where clustering or ordering of documents based on relative distances can be computed using approximate distances. In these situations, instead of computing and storing pairwise distances for respective nodes in a graph, such as an adjacency matrix, merely storing some information about the respective nodes in the graph may suffice. Such information may be used at runtime to compute a distance between any two nodes in the graph.

Current and previous solutions are typically limited to particular kinds of graphs, such as planer graphs, trees, and bounded degree graphs. Further, some previous solutions may not allow for computation of a number of paths between any two nodes, and/or require dependence of label assignment to nodes in the graph on existence of "beacon" nodes in a dominant set, which may require the use of additional computational time and/or other resources. Additionally, some previous solutions require that the graph be connected to the system so that it can be preprocessed to compute labels. Some previous solution may need specialized information in computing graph labeling that may not be readily available for many large graphs that may utilize such a system.

Techniques and systems are accordingly disclosed herein for efficiently computing a pairwise distance between nodes in a large graph (e.g., a notion of degree of separation). The techniques and systems disclosed herein utilize a linear storing construct for storing information for a number of nodes in a graph into memory, and are very efficient in computing an approximate distance at runtime. In the techniques and systems described herein, "beacon" nodes are not utilized, the graph does not need to be connected (e.g., computations can be performed "offline"), node distances for a wide variety of large graphs may be determined, and information that is typically readily available is used for determining distances between nodes in a graph.

In one embodiment, a URL-sketch can be generated for respective nodes in an index (e.g., graph), such as web-pages in a search engine database. Generating the URL-sketches can comprise extracting labels from respective nodes, where the labels provide a reference to a link between the nodes, aggregating the labels into a set for the respective nodes, and storing the sets of labels in a manner that provides for efficient storage and retrieval (e.g., such as mapping to a bit-vector and storing the sketches in hash tables). Further, neighborhood-sketches can be generated for the respective nodes in the index using the URL-sketches, where a neighborhood comprises nodes from the index that neighbor the node of interest. Generating the neighborhood sketches can comprise determining a neighborhood for a node, and generating a sketch of the neighborhood using labels that are associated with the respective neighboring nodes. A distance between two nodes in the index can be determined by computing an approximate number of paths between the two nodes, and computing an approximate path length between the two nodes, using the neighborhood sketches for the two nodes.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
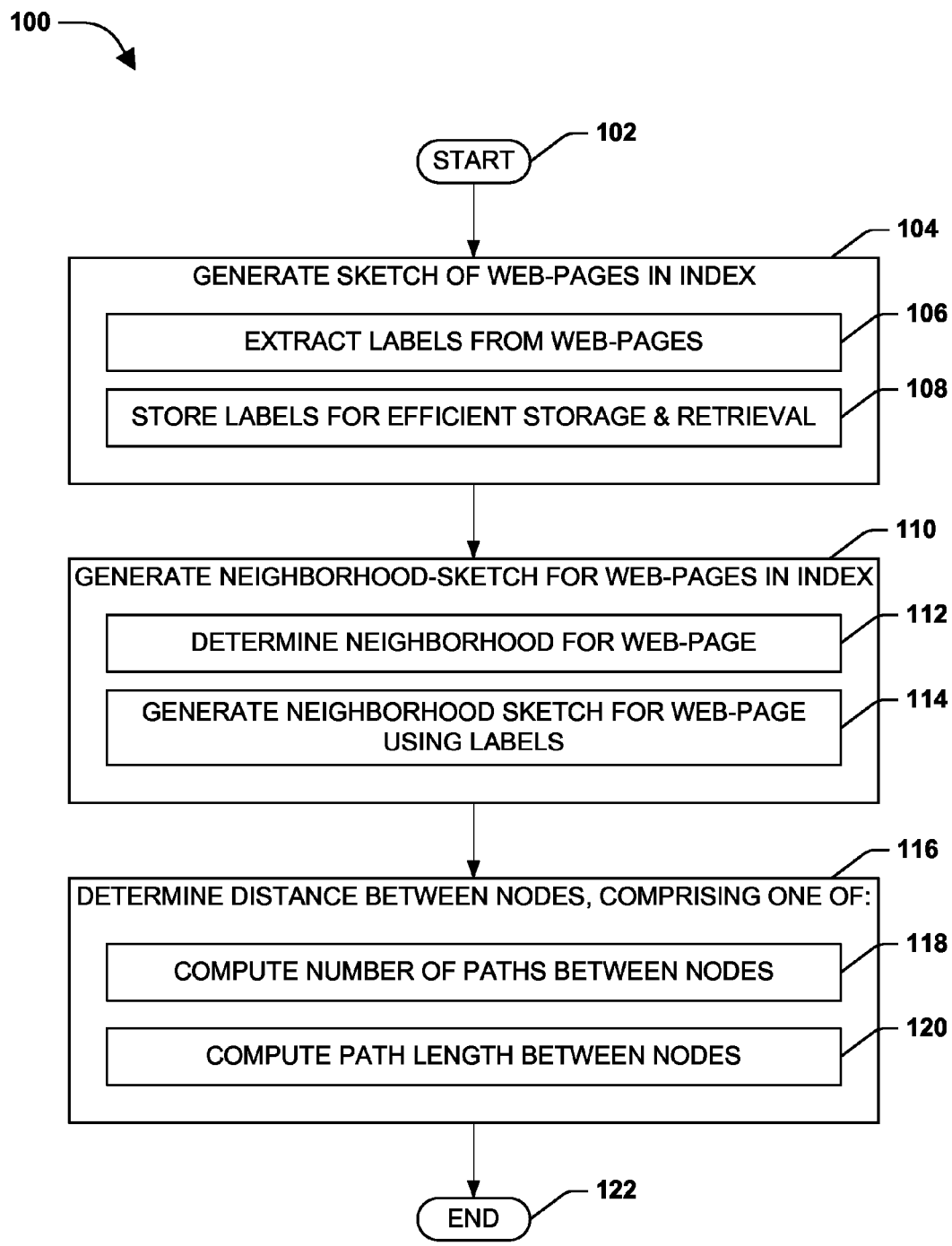
FIG. 1 is a flow chart diagram illustrating an example method for efficiently computing a pairwise distance between nodes in a large graph.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A method may be devised that provides for measuring distances between nodes in a large graph, such as web-pages in an index of web-pages, where distance may comprise similarity along with other measures of distance. FIG. 1 is a flow chart diagram of an exemplary method 100 for efficiently computing a pairwise distance between nodes in a large graph. The exemplary method 100 begins at 102 and involves generating a URL-sketch of respective web-pages in an index of web-pages, at 104. In one embodiment, a URL-sketch (e.g., URL referring to a uniform resource locator associated with web-pages) may comprise a list of other web-pages in the index that connect with a particular web page URL in the index, for example, using a link to the web page URL.

At 106, generating a URL-sketch of respective web-pages in an index of web-pages comprises extracting labels from the respective web-pages, and storing sets of labels for respective web-pages in the index for efficient storage and retrieval, at 108. For example, labels that identify a connection from a first website to a second website can be extracted for the respective websites in the index. In one embodiment, a set of labels can be extracted for the second website from the other first websites in the index, and the set of labels may represent a URL-sketch for the second website, corresponding to other first websites in the index that link to the second website.

Respective sets of labels, corresponding to URL-sketches for the websites in the index, can be stored efficiently so that use of resources may be mitigated. Further, the sets of labels can be stored in a manner that allows for efficient retrieval of the URL-sketches at runtime, for example, when distances between nodes are to be measured. In one embodiment, the URL-sketches can be mapped to bit vectors, which in-turn, may allow the URL-sketches to be stored in a hash-table-type configuration. A hash-table storage configuration is a data storage configuration that provides for very efficient storage and retrieval of the data.

At 110, in the exemplary method 100, a neighborhood-sketch is generated for the respective web-pages in the index using the URL-sketches. For example, a neighborhood sketch may comprise a graphical representation that depicts how nodes in a URL-sketch for a website are connected to each other. In one embodiment, nodes may be connected by common data, labels, domain names, or other information that links (or does not link) nodes in a URL-sketch. As an example, two different news websites may be linked to each other by having news articles about a same incident. In another example, different websites may be linked by being part of a same domain.

At 112, generating a neighborhood-sketch for the respective web-pages in the index comprises determining a neighborhood for a web-page, where the neighborhood is comprised of neighboring nodes, and generating a neighborhood sketch for the web-page using labels associated with the neighboring nodes, at 114. For example, in order to determine the neighborhood of a website, the neighboring nodes and how they are connected can be explored.

In one embodiment, a random-surfer model may be used to explore the URL-sketch for a website. In this embodiment, starting at the website, the random surfer model randomly selects neighboring nodes by selecting links from the website and subsequently from the nodes that are linked. At random intervals, the model returns to the website and begins randomly surfing again. In one embodiment, the various surfing journeys undertaken by the model can be compiled and a list of nodes visited can be ranked according to a number of visits by the model, for example. In this example, a neighborhood for the website can be selected based on selection of a desired number of the visited nodes according to their rank in the list.

In another embodiment, a node similarity bias walk model may be used to explore the URL-sketch for a website. In this embodiment, starting at the website, the node similarity bias walk model uses a similarity between nodes to bias the walk through the nodes in the neighborhood. For example, this model may be thought of as exploring the neighborhood by choosing similar nodes to explore during a walk starting from the website of interest in the URL-sketch. In one embodiment, a similarity can be inversely proportional to a distance between nodes. For example, similarity between nodes may be represented as: $sim(u,v)=1-dist(u,v)$, where u and v are nodes in the URL-sketch, and $sim()$ and $dist()$ are functions of similarity and distance respectively.

In one embodiment, the distance (e.g., used to determine similarity between nodes) may comprise a hamming distance between corresponding URL-sketches for the nodes in question. A hamming distance can be a number of positions in URL-sketches of a same size for which corresponding nodes are different, for example. In other words, a hamming distance may be thought of as a number of websites in a first URL-sketch that need to be changed in order to have the same websites as a second URL-sketch. In this embodiment, for example, a larger hamming distance may indicate a bigger difference between nodes, therefore less similarity.

In another embodiment, another deterministic type of graph exploration model may be used to explore the neighborhood of a URL-sketch for a website. As an example, a breadth-first model may be used whereby exploration begins at the website of interest and explores the remaining nodes in a deterministic manner by starting with a first level of nodes, then exploring children of the first level nodes, and so on, until the respective nodes in the URL-sketch have been explored.

After determining which nodes are in a neighborhood for a node of interest, the neighborhood sketch can be generated. In one embodiment, a similar technique to the one used for creating a URL-sketch may be used. For example, in this embodiment, tokens used to identify links to a node of interest may be a domain/URL name in the neighborhood, or some other label that links respective nodes in the neighborhood to the node for which the sketch is being created. As a further example, a sketch may be created for a node that comprises a domain "foxnews.com", whereby those neighboring nodes that have a domain of "foxnews.com" may be aggregated for the node of interest, to create a neighborhood sketch.

Figure 2:
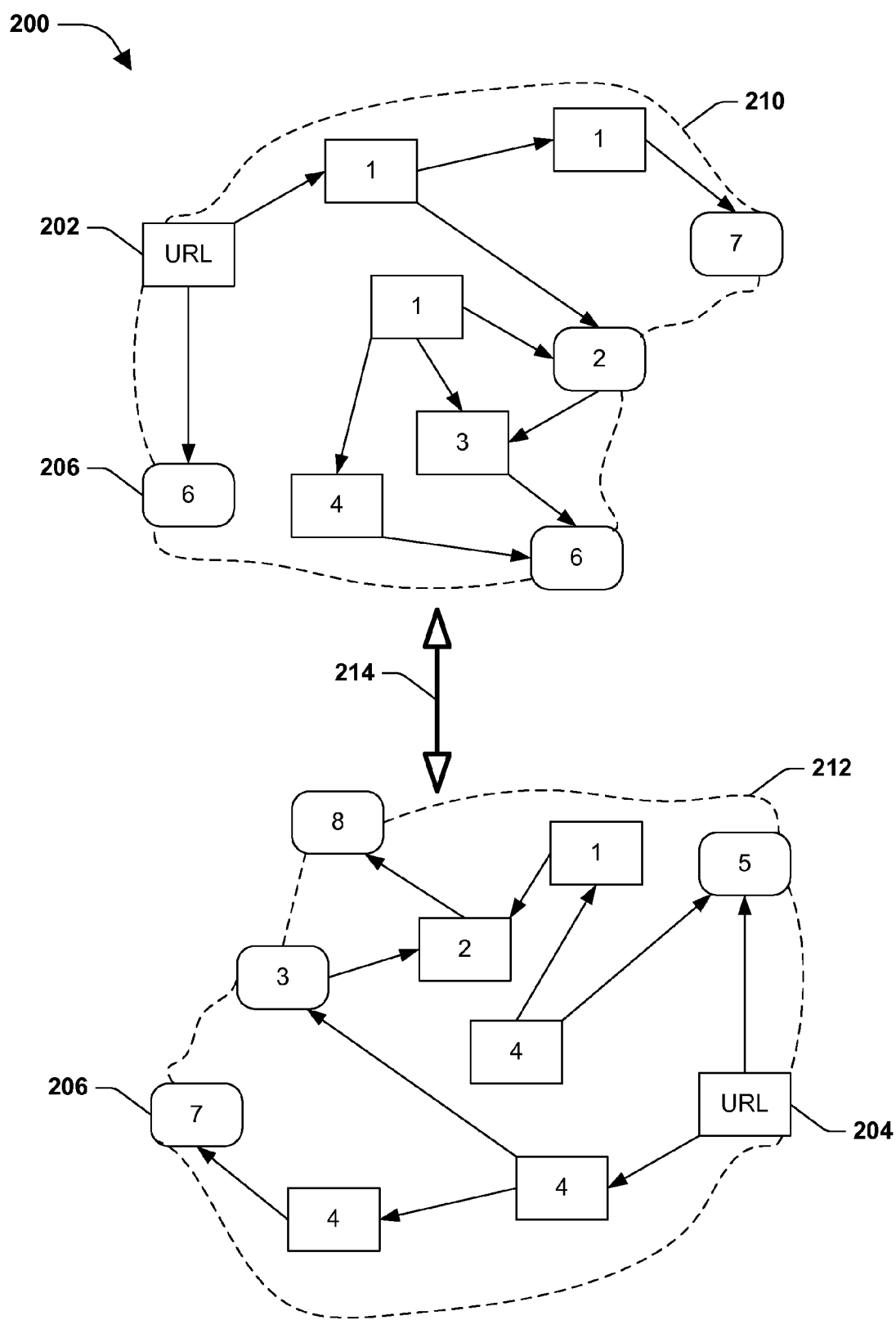
FIG. 2 is an illustration of an example environment comprising neighborhood sketches for a first URL and a second URL.

FIG. 2 is an illustration of an exemplary environment 200 comprising neighborhood sketches 210 and 212 for a first URL 202 and a second URL 204. The respective neighborhood sketches 210 and 212 comprise nodes 206 and links between the respective nodes 206. As an example, the neighborhood sketch 210 for the first URL 202 identifies a link of one hop to node one and node six. Further, in this example, node one links to node two, this links to node three, which links to node six. The links between the nodes 206 help identify how the neighborhood 210 may be structured, for example, so that common paths and path distances may be determined when determining distances between nodes.

In the exemplary method 100, at 116, a distance between two nodes in the index is determined. For example, now that neighborhood sketches for the respective nodes in the index, such as an index of websites (e.g., a web-crawler search engine index), a distance between nodes in the index may be determined using the respective neighborhood sketches.

At 118, determining a distance between two nodes in the index comprises computing an approximate number of paths between the two nodes, and computing an approximate path length between the two nodes, at 120. In one embodiment, in order to determine an approximate number of paths between the two nodes a number of common nodes between the neighborhood-sketches of the two nodes can be counted. In this embodiment, if the neighborhood sketches for the nodes in question share common nodes, for example, it is likely that these shared common nodes are part of a shared path between the nodes in question.

In another embodiment, a number of paths between two nodes may be determined using "effective resistance" between the nodes in question. Commonly, effective resistance between two nodes of a graph is an electrical resistance between nodes of a resistor network. However, the notion of effective resistance may be applied to nodes of a large graph, such as a graph of websites. Essentially, in this embodiment, an effective resistance is inversely proportional to a number of paths between nodes. Therefore, for example, if the effective resistance between the two nodes in question is low, there may be a large number of paths between the nodes. The application of effective resistance to large graphs and determining a number of paths between nodes is explored in "Minimizing Effective Resistance of a Graph," A. Ghosh, S. Boyd, A. Saberi, SIAM Review, Vol. 50, No. 1, pages 37-66 (2008).

In one embodiment, computing an approximate path length between the two nodes may comprise determining a location of the common nodes between the neighborhood sketches. For example, while a shared path between the nodes in question may be inferred by a presence of a common node in the neighborhood sketches, a length of that path is unknown. Therefore, in this embodiment, if a common node is merely one hop away from a first node in its corresponding neighborhood sketch and merely one hop away from a second node in its neighborhood sketch, it can be determined that the first and second nodes are two hops (two path lengths) away from each other.

As an example, in the exemplary environment 200 of FIG. 2, node seven of the nodes 206 in the URLs' 202 and 204 neighborhood sketches 210 and 212 is a common node shared by both URLs' neighborhoods, thereby representing a path between the URLs 202 and 204. Further, node seven is three path lengths away from the URL 202 in its neighborhood sketch 210, and three path lengths away from URL 204 in its neighborhood sketch 212. Therefore, a distance 214 between the URLs 202 and 204, over a shared path using node seven of the nodes 206, is six path lengths (e.g., six hops between the nodes). Further, in this example 200, there are other shared nodes (one, four, and three) for which distances 214 can be determined.

Having determined a distance between two nodes, the exemplary method 100 ends at 122.

Figure 3:
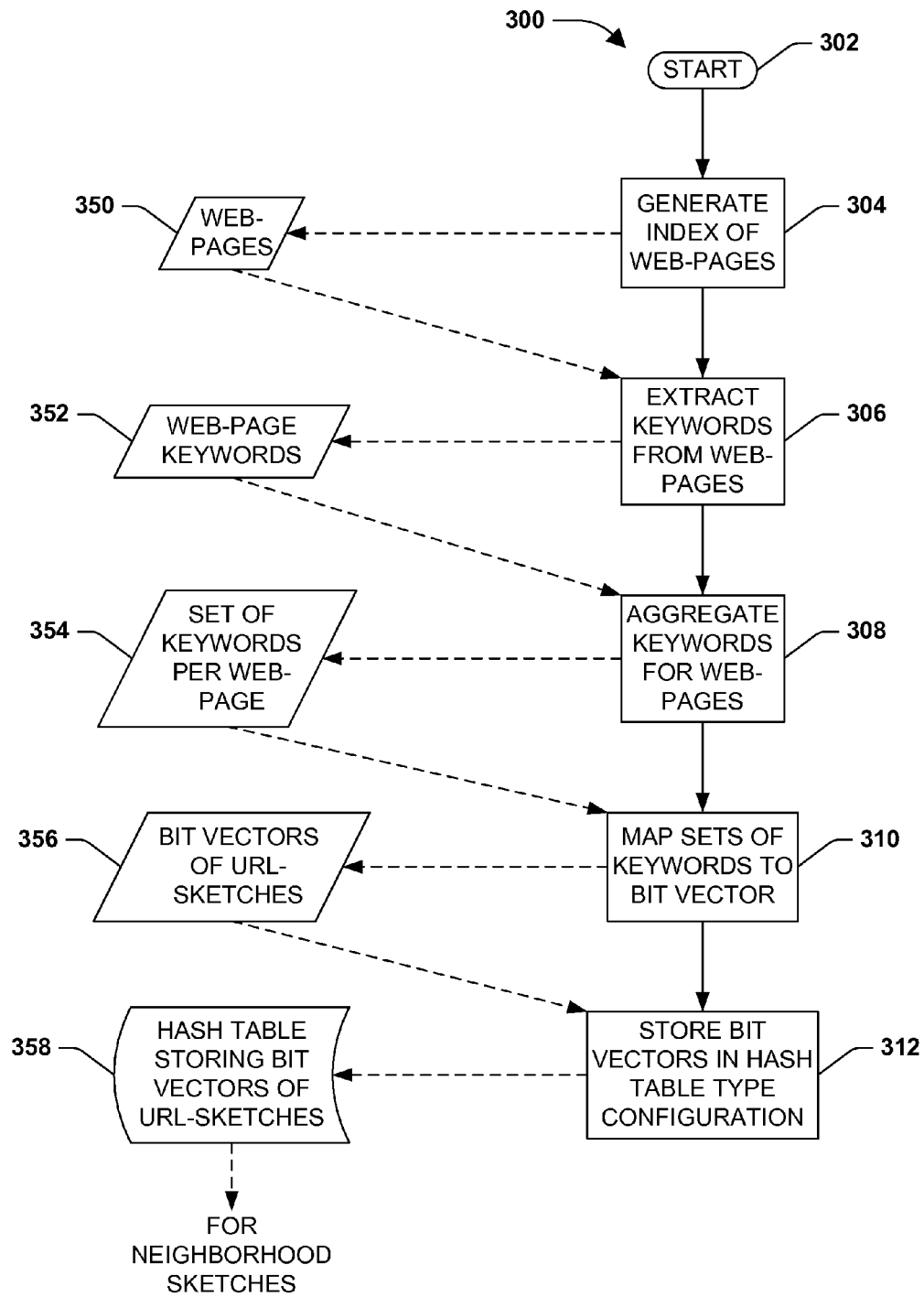
FIG. 3 is a flow diagram illustrating example portions of a method where URL-sketches are generated for nodes in a graph.
Figure 4:
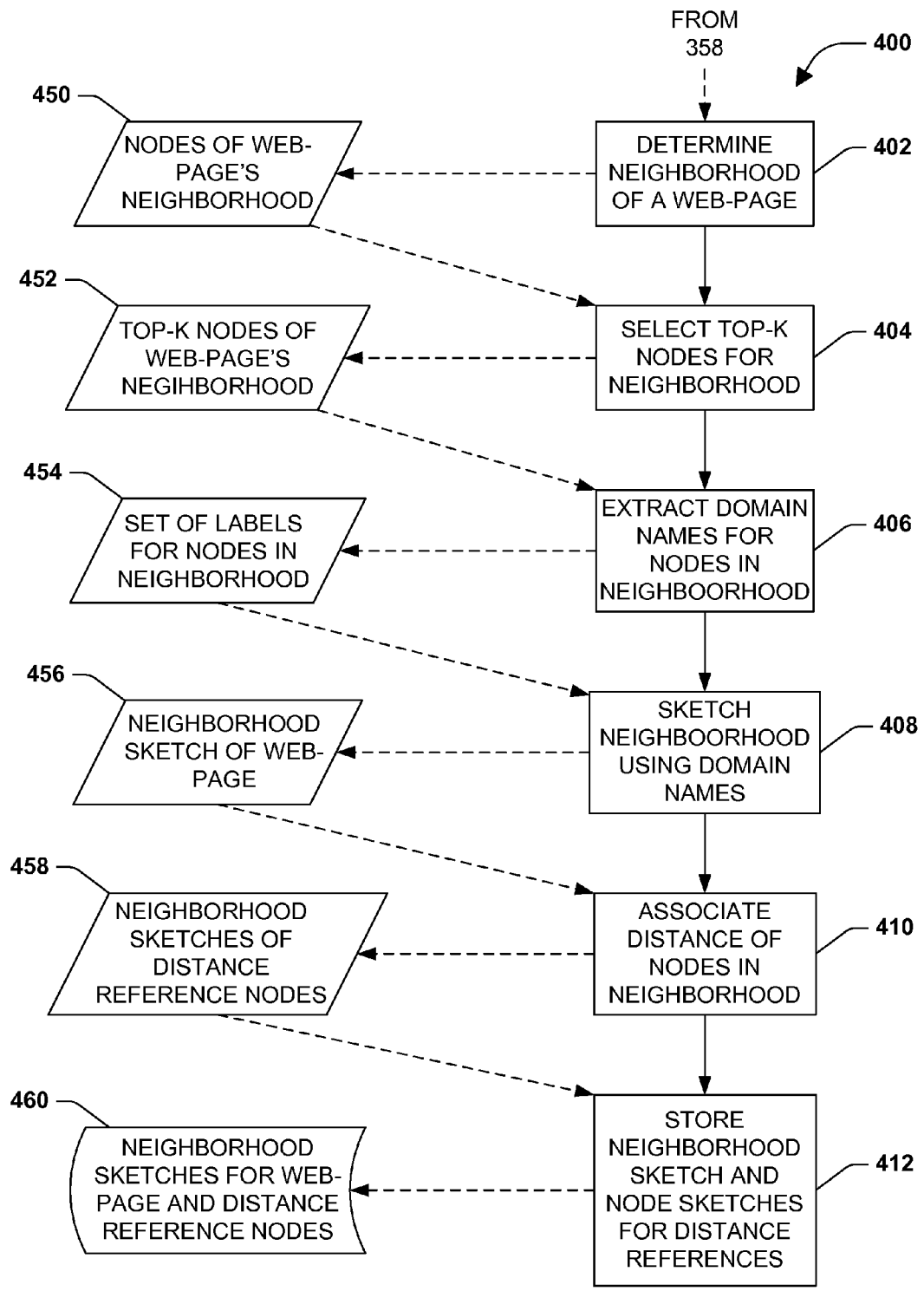
FIG. 4 is a flow diagram illustrating example portions of a method where neighborhood-sketches are generated for nodes in a graph.
Figure 5:
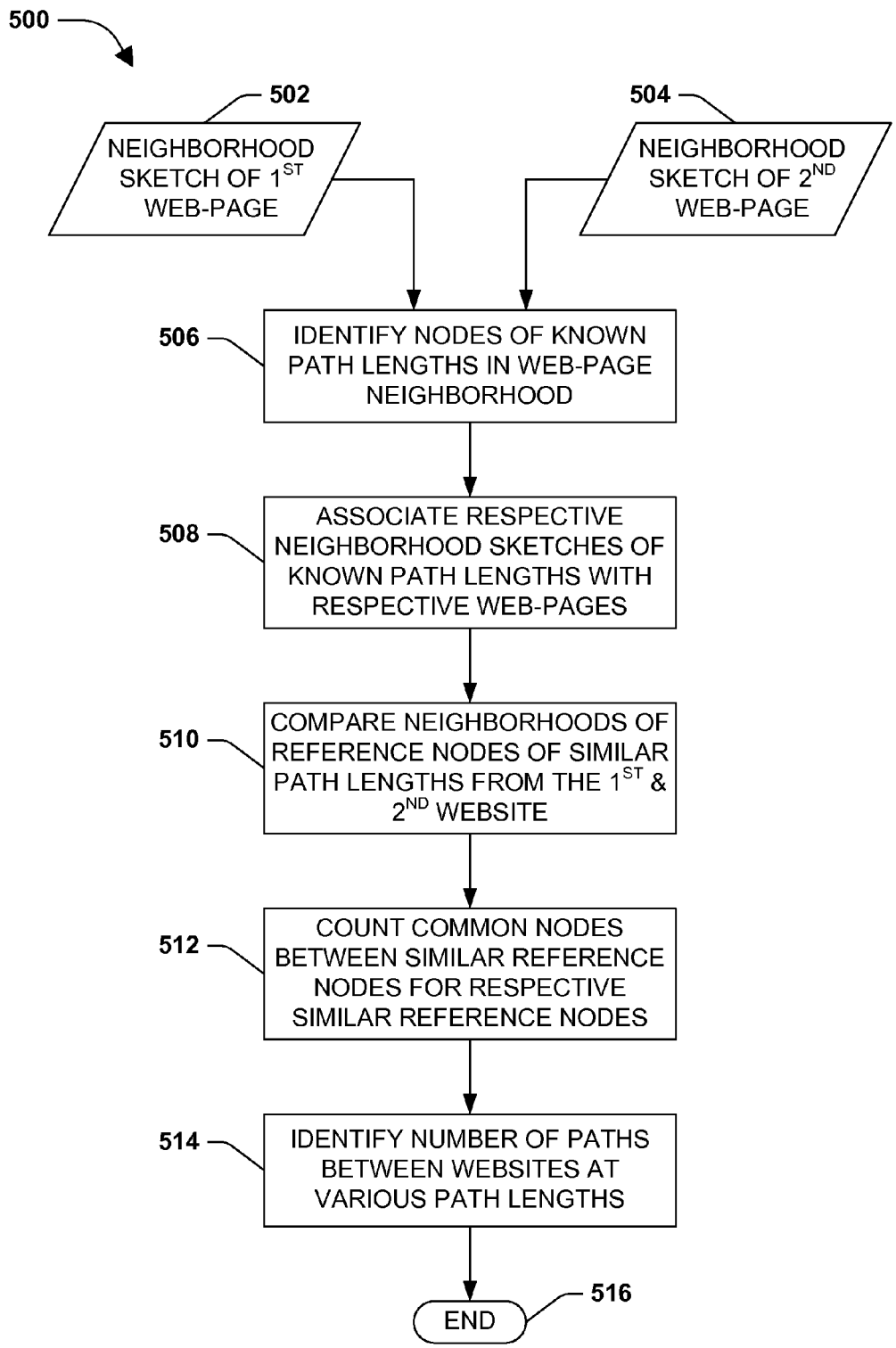
FIG. 5 is a flow diagram illustrating example portions of a method where pairwise distances between nodes in a graph are determined.

FIGS. 3 to 5 illustrate one embodiment of how to efficiently compute a pairwise distance between nodes in a large graph. FIG. 3 is a flow diagram illustrating exemplary portions of a method 300 where URL-sketches are generated for nodes in a graph. The exemplary method 300 begins at 302 and involves generating an index of web-pages, at 304. For example, Internet-based search engines often utilize web-crawlers for increasing and updating their database of websites. In this example, one embodiment of an index of web-pages 350 may be the database of websites maintained by the search engine, and updated by the web-crawler.

It will be appreciated that, while web-pages are utilized in this embodiment, the techniques and systems described herein are not limited to these embodiments. It is anticipated that those skilled in the art may devise alternate ways to apply these techniques and systems. For example, an index of Internet-based advertisements may be generated and applied to this exemplary method 300. Further, relatively any set of objects that may be arranged in a large graph, for which distances between nodes is desired to be determined, may apply the techniques and/or systems described herein.

At 306, keywords 352 may be extracted from web-pages in the index 350 for the respective web-pages. In one embodiment, a first web-page in the index may be searched for anchor strings (e.g., a string of words), to be used as proxy strings, that comprise a link to a second web-page. For example, a string "xyz" may be used to refer to a link to the second web-page (e.g., <a href http://'second web-page'.com>xyz</a>), and the string "xyz" may be extracted as a label for the second web-page. In this embodiment, the proxy strings can be associated to the second web-page. In this embodiment, key words are extracted that correspond to the respective web-pages in the index 350.

At 308, the keywords 352, comprising link identifiers to a web-page, are aggregated as a set of keywords 354 for the web-page to which their links point. For example, a set of key words 354 for a particular web-page in the index 350 may comprise the proxy strings that identify those web-pages in the index that link the web-page of interest. Therefore, in this embodiment, the sets of keywords 354 for the respective web-pages in the index can represent a URL-sketch of those web-pages that are linked to a URL in the index.

At 310, the sets of keywords 354 are mapped into bit vectors 356 representing the URL-sketches for the respective web-pages in the index 350. In one embodiment, the sets of keywords 354 can be mapped into bit vectors 356 in hamming space. Hamming space is a set of all $2^N$ binary strings of length N. For example, if a bit vector comprises a binary string of length eight, the hamming space comprises a set of $2^8$ binary strings. In this embodiment, for example, mapping bit vectors in hamming space may provide for using a hamming distance to compute a distance between nodes. For example, a hamming distance can comprise a number of positions in a first binary string that need to be changed to match a second binary string.

Further, mapping the sets of keywords 354 to bit vectors 356 can provide a memory efficient manner of data storage. Additionally, this type of storage can enable efficient runtime distance computations. At 312, in order to provide efficiency of storage and retrieval, for example, the URL-sketches, comprising the sets of key word mapped as bit vectors 356, can be stored with their corresponding URL from the index in a hash-table type configuration 358. A hash table is a data storage configuration that associates a key with respective values stored in the hash table. At runtime, the values can be efficiently retrieved by running the key through a hash function that computes a hash value pointing to a location of the values, for example.

It will be appreciated that the techniques and systems for creating a URL-sketch are not limited to the embodiments described above. Those skilled in the art may devise alternate techniques for computing a URL-sketch for web-pages in an index. For example, minimal hashing techniques may be utilized, as described in "Min-wise Independent Permutations, A. Z. Broder, M. Charikar, A. M. Frieze, M. Mitzenmacher, Proceedings of 13$^{th}$ ACM Symposium on Theory of Computing, pages 327-336, (Dallas, Tex.).

FIG. 4 is a flow diagram illustrating exemplary portions of a method 400 where neighborhood-sketches are generated for nodes in a graph. In the exemplary method 400, a neighborhood for a web-page is determined, at 402, using the URL-sketches stored as bit vectors in a hash table 358. For example, a URL-sketch for a particular URL from the index comprises those other web-pages in the index that link to the URL of interest. In this embodiment, as described above, a random surfer model, node similarity bias walk model, or some other deterministic exploratory model may be utilized to identify a neighborhood for the URL, comprising nodes of a particular web-page's neighborhood 450.

At 404, a desired number (k) of nodes may be selected 452 from the neighborhood nodes 450 identified that represent nodes that were visited more times by the exploration model. For example, during exploration by the random surfer model, some nodes in the neighborhood may be visited more often than others. In this example, the neighboring nodes may be ranked according to a number of times they were visited during the exploration phase. Further, the top k nodes 452 can be selected for use in a neighborhood sketch of the URL of interest.

At 406, in the exemplary method 400, a set of domain names 454 can be identified and extracted that are common to the respective nodes in the neighborhood, or some other label may be used that is common to the nodes in the neighborhood. For example, when computing a URL-sketch for a website keywords were used as labels to identify linked nodes; here the neighborhood sketch is computed in a similar manner by using a token such as a domain/URL or some other label common to the respective neighborhood nodes 452. Sets of labels 454 can be extracted for the respective nodes that have URL-sketches.

At 408, a neighborhood sketch 456 for a particular node can be determined using the set of domains 454 for the node of interest. The neighborhood sketch 456 can be stored, as described above, for example. At 410, respective neighboring nodes are a certain distance (e.g., number of hops, or path length) from the URL of interest (e.g., as in FIG. 2, 200, node seven is three hops from the URL 202). The distances for the respective neighboring nodes can be associated with the neighboring nodes, and neighborhood sketches for these distance reference nodes 458 can be identified. For example, where there may be neighboring nodes of one hop, two hops and fours hops from the URL, distance reference neighborhood sketches 458 can be identified for these nodes.

At 412, the neighborhood sketch 456 for the URL and associated distance reference neighborhood sketches 458 can be stored 460 for the URL of interest, for the respective URLs in an index. For example, where a neighborhood sketch has been created for a particular web-page, neighborhood sketches for distance reference nodes in the web-page's neighborhood can be stored with the web-page's neighborhood sketch.

FIG. 5 is a flow diagram illustrating exemplary portions of a method 500 where pairwise distances between nodes in a graph are determined. In the exemplary method 500, at 506, nodes of known path lengths are determined for a respective neighborhood sketch of a first web-page 502 and a second web-page 504 (e.g., as in FIG. 4, 410). For example, where $u_1$ is the first-webpage, and $v_1$ is a node in the first web-page's neighborhood sketch $V_1$, d is a distance (e.g., in hops, or path length) between u and v. In this example, for $u_1$, we can identify one or more nodes ($v_1$), where d=1, 2≤d<4, and 4≤d 8.

Therefore, these nodes ($v_1$) of known distances (distance reference nodes) can be identified for $u_1$, as well as identifying distance reference nodes for the second web-site from its neighborhood sketch. Further, at 508, neighborhood sketches for the distance reference nodes can be associated to the respective web-pages for which they serve as distance references. In one embodiment, merely a few distance reference node neighborhood sketches may be associated for the respective distances, for example, in order to save storage space and runtime efficiency.

At 510, a distance reference node having a known path length for the first web-page can be compared with a distance reference node for the second web-page having a same path length as the distance reference node for the first web-page. For example, a $v_1$ that has a d=1 can be compared with a $v_2$ that has a d=1. Further, a $v_1$ that has a d=2 can be compared with a $v_2$ that has a d=2, and so-on. At 512, a number of common (shared) nodes between the distance reference nodes for the respective web-pages is determined. For example, if a same node belongs to both neighborhood sketches for the respective distance reference nodes, it is shared by the respective nodes.

At 514, a number of paths between the websites can be determined for respective path lengths. In one embodiment, because the distance reference nodes are used as reference points for distance from the web-pages, the number of shared nodes may be used to determine an approximate number of paths between the web-pages. For example, if an intersection of $v_1$ with a d=2 and a $v_2$ with a d=2 is 4 common nodes, it may be inferred that there are 4 paths between the first web-page and the second web-page having a distance of 2 or 3 hops (where 2≤d<4).

Having determined a distance between two pairwise nodes in a large graph, the exemplary portion of a method 500 ends at 516.

In one aspect, a number of paths between any two nodes may be an accurate indicator of a similarity between the nodes. For example, where a domain is used as a label for nodes in respective neighborhood sketches, a path between the nodes can indicate a shared node having a same domain. In this example, a greater number of paths can indicate a greater number of shared domains, which may further indicate an increase in similarity between the nodes.

Other labels may be used, for example, new items for news web-pages. In this example, a search engine may wish to return relevant results to a user that comprise a variety of websites covering a particular topic. Both "CNN.com" and "NBC.com" may comprise a series of one or more same Associate Press articles on their websites, creating one or more paths between the two websites. The search engine may apply the techniques and systems, described herein, to determine that "CNN.com" and "NBC.com" are relatively close in distance, by noting a similarity between the websites from the shared nodes labeled by the shared articles. In this example, the search engine may determine that returning results from both websites is redundant and can choose to merely display results from one of the two.

In another aspect, a number of paths between two nodes may play an important role in other graph distances. For example, "hitting time" (h(u,v)) can be a first time at which a given process "hits" a given subset v of the process's state space when starting from u. Further, for example, "commute time" (c(u,v)) can be a time for the process to travel between the starting point u and the subset v of the process's state space. In this example, c(u,v)=h(u,v)+h(v,u), which may be affected by a number of paths between the nodes u and v.

In another aspect, a number of paths between nodes in an index may be used to determine an importance of a particular node in the index (e.g., PageRank®). For example, a node may be considered to have a closer distance to other nodes in the index where there are a greater number of paths between the nodes. In this example, if a node has a higher number of paths that link it to another node it may be considered to have a higher level of importance. Further, paths to a node from another node that has a higher level of importance may be weighted higher than paths from nodes with lower importance. In this way, in this example, a ranking of nodes by way of importance can be determined based on their distances to other nodes in the index, using a number of paths between nodes from the neighborhood sketches. This example may be incorporated into a search algorithm that returns results for a query ranked by order of importance.

Figure 6:
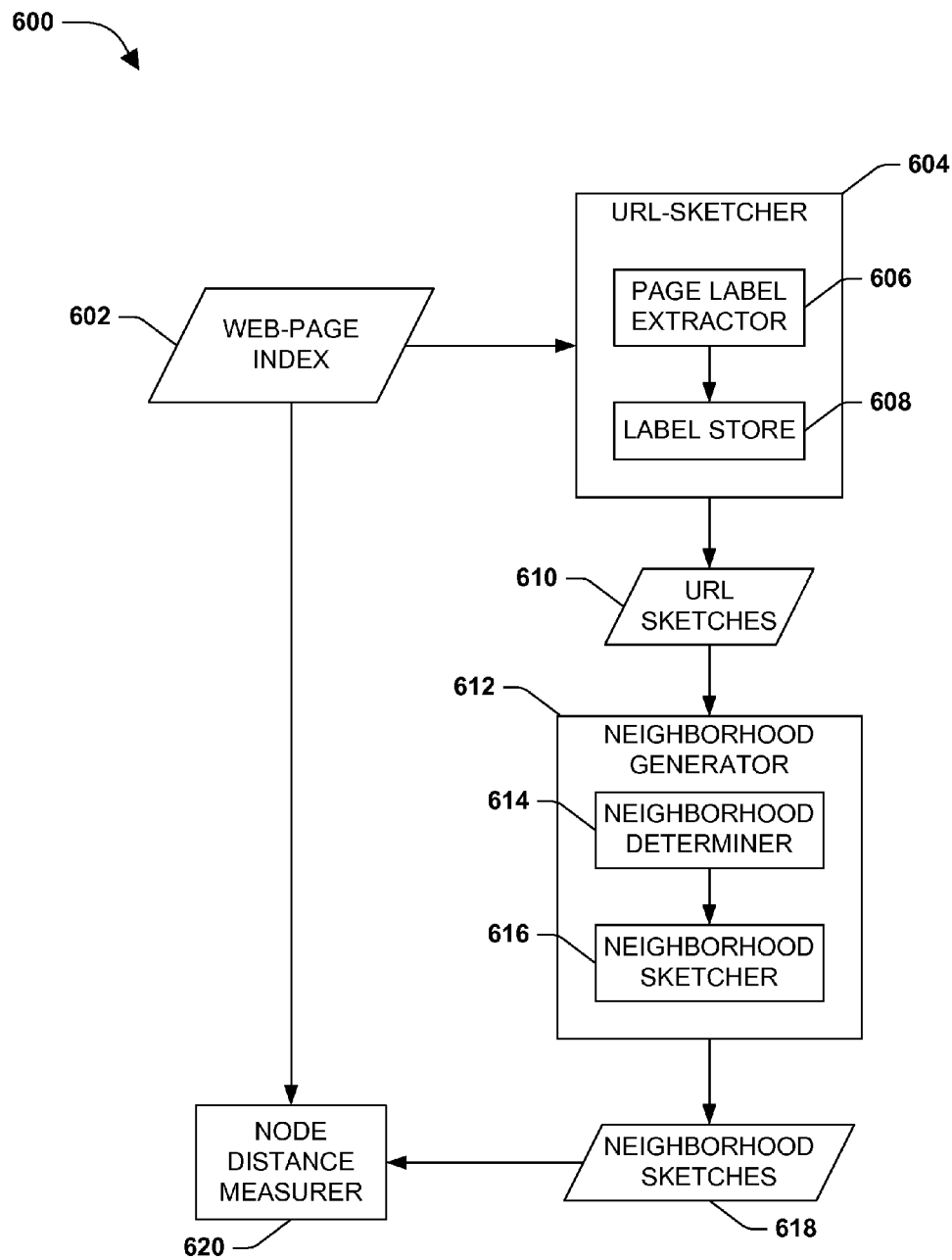
FIG. 6 is a component block illustrating an example system for efficiently computing a pairwise distance between nodes in a large graph.

A system may be devised that can determine distances between nodes in an index. FIG. 6 is a component block illustrating an exemplary system 600 for efficiently computing a pairwise distance between nodes in a large graph. The exemplary system 600 comprises a URL-sketch generator 604 that is configured to create URL-sketches of web-pages in an index of web-pages. The URL-sketch generator 604 further comprises a web-page label extractor 606 and a label set store 608.

The URL-sketch generator 604 is configured to extract a set of labels that reference a first web-page from a set of second web-pages in an index 602 for respective web-pages in the index 602. The labels extracted from the set of second web-pages in the index 602 can reference a link between the first and second web-pages, thereby creating a URL-sketch (e.g., a sketch of URLs linked with the first web-page) for the first web-page. The label set store 608 is configured to store sets of labels for respective web-pages for efficient storage and retrieval. For example, sets of labels extracted for the respective web-pages in the index 602 can be stored in the label set store 608, thereby creating a stored URL-sketches 610 for the respective web-pages in the index 602.

The exemplary system 600 further comprises a neighborhood generator 612 configured to generate a neighborhood-sketch for the respective web-pages in the index 602. The neighborhood generator 612 further comprises a neighborhood determiner 614 and a neighborhood sketcher 616. In one embodiment, URL-sketches 610 can be retrieved and the neighborhood determiner 614 is configured to compute a neighborhood for a web-page using the corresponding URL-sketch, where the web-page's neighborhood comprises nodes neighboring the web-page. For example, where neighboring nodes may comprise links to the web-page of interest, the neighborhood determiner 614 can identify those nodes most often referenced during a web-based exploration of the nodes.

The neighborhood sketcher 616 is configured to generate a neighborhood sketch 618 for the web-page using labels associated with the respective neighboring nodes. For example, after a neighborhood of nodes is selected by the neighborhood determiner 614 the neighborhood sketcher 616 may extract labels for the respective neighboring nodes that are common to the respective nodes in the neighborhood. Using the labels, the neighborhood sketcher 616 can create a sketch of the neighborhood, relative to the website of interest, for example, that identifies respective nodes and their distances (e.g., in hops) from the web-page of interest. In this way, neighborhood sketches 618 can be created for the respective web-pages in the index 602 using the corresponding URL-sketches 610.

The exemplary system 600 further comprises a node distance measuring component 620 that is configured to determining a distance between two nodes (e.g., web-pages) in the index 602. In one embodiment, the node distance measuring component 620 may compare a neighborhood sketch from a first web-page with a neighborhood sketch from a second web-page to determine how many common nodes are shared by the two neighborhood sketches. In this embodiment, a number of shared common nodes may indicate a number of paths that link the two web-pages, for example.

Figure 7:
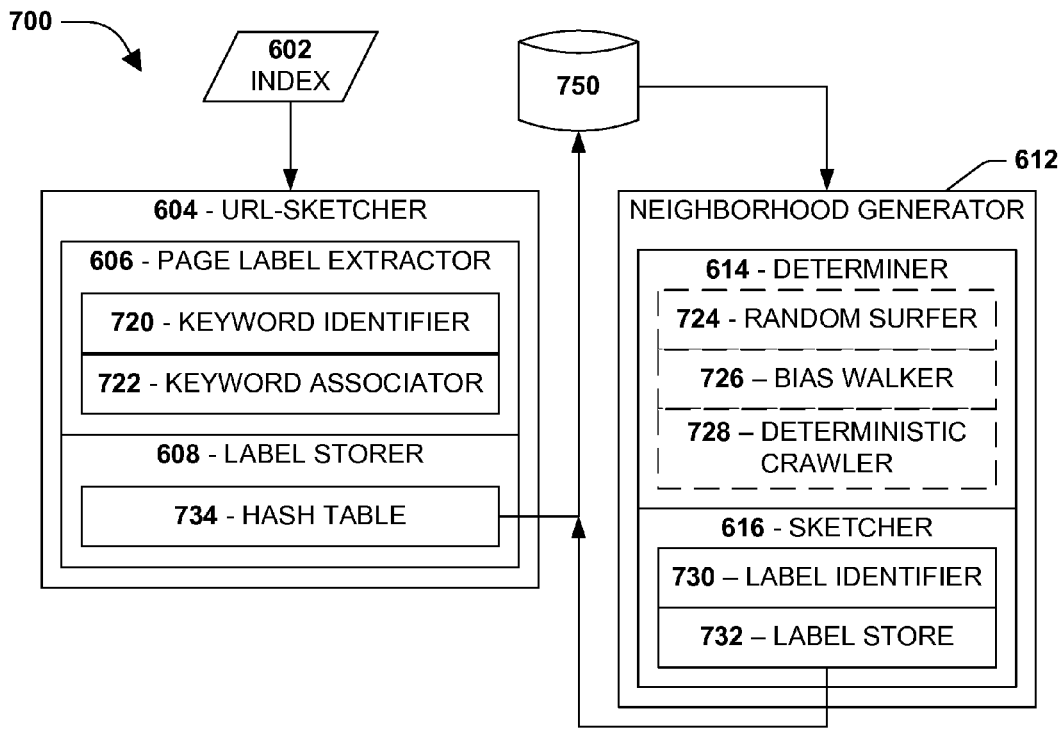
FIG. 7 is one example embodiment of components used in the systems described herein.

FIG. 7 is one exemplary embodiment 700 of a URL-sketch generator 604 and a neighborhood generator 612 used in a system for efficiently computing a pairwise distance between nodes in a large graph. In the exemplary embodiment 600 the web-page label extractor 606 comprises a keyword identifier 720 and a keyword associating component 722. The keyword identifier 720 can be configured to identify proxy-strings in a first web-page that reference a link to a second web-page. For example, where the first web-page has a link to the second web-page, the keyword identifier 720 can extract a proxy string from the first web-page that references the link to the second web-page.

The keyword associating component 722 is configured to associate a set of proxy-strings from the web-pages in the index 602 to the second web-page. In one embodiment, proxy strings that reference a link to the second web-page may be extracted from a plurality of first web-pages in the index 602. The proxy strings for the second web-page may be aggregated by the keyword associating component 722 as a set of keywords for the second web-page, for example. Further, the keyword associating component 722 may aggregate sets of keywords for the respective web-pages in the index 602.

In the exemplary embodiment 700, the label set store comprises a hash-table type storage component 734. In this embodiment, sets of keywords generated by the web-page label extractor 606 may be mapped to binary strings, for example, thereby creating URL-sketches for the respective web-pages in the index 602. The respective binary strings representing URL-sketches can be stored in the hash table 734, for example, that allows for efficient storage and retrieval of data. In this embodiment, for example, the hash table 734 may be stored in a storage component 750 for the system.

A neighborhood determiner 614 can comprise an exploration model used to determine neighboring nodes for a web-page, using the URL-sketches stored in the storage component 750. In the exemplary embodiment 700, the exploration model may comprise one of: a random surfer modeling component 724, a similarity bias walking component 726, or a breadth-first type graph explorer model 728.

The random surfer modeling component 724 is configured to compute neighboring nodes for a web-page by randomly crawling a URL-sketch for the web-page starting from the web-page. Using this model 724, starting at the web-page of interest, neighboring nodes are identified by undertaking a random walk through the nodes using the links associated by the URL-sketch. In this embodiment, the model 724 moves from node to node in the URL-sketch and randomly returns to the web-site of interest to begin surfing the nodes again. In one embodiment, those neighboring nodes identified as having a highest number of visits by the model 724 may be included in a neighborhood for the web-page of interest.

The similarity bias walking component 726 is configured to compute neighboring nodes for a web-page by crawling a URL-sketch for the web-page using a node similarity bias starting from the web-page. For example, the component 726 can explore (e.g., travel to) nodes by identifying a node in the URL-sketch based on a similarity (e.g., most similar) to a node from which it begins, starting with the web-page of interest. In this way, for example, the similarity bias walking component 726 can create a neighborhood for the web-page of interest based on similarity. In one example, those nodes closest to the web-page of interest may be more similar to the web-page of interest, while those nodes further from the web-page of interest may be less similar to the web-page of interest.

The breadth-first type graph explorer model 728 is configured to use a deterministic crawl of a URL-sketch for the web-page starting from the web-page. For example, the model 728 may begin at the web-page of interest and explore those nodes in a first layer of distance away from the web-page of interest, then proceed to children nodes of those in the first layer, and so-on.

In the exemplary embodiment 700, the neighborhood sketcher comprises a neighborhood label identifier 730 and a label set store 732. The neighborhood label identifier 730 is configured to identify a set of labels that are common to the respective nodes in the neighborhood identified by the neighborhood determiner 614, such as domains or URLs. The label set store 732 is configured to store sets of labels for respective nodes for efficient storage and retrieval. In one embodiment, a set of neighborhood labels for a web-page of interest can comprise a neighborhood sketch for the web-page, which can be stored, for example, in a hash table 734, as described above. In this embodiment, the hash table comprising the neighborhood sketches for the web-pages in the index 602 can be stored on the storage component 750, for later efficient retrieval at runtime, for example, when node distances are determined.

Figure 8:
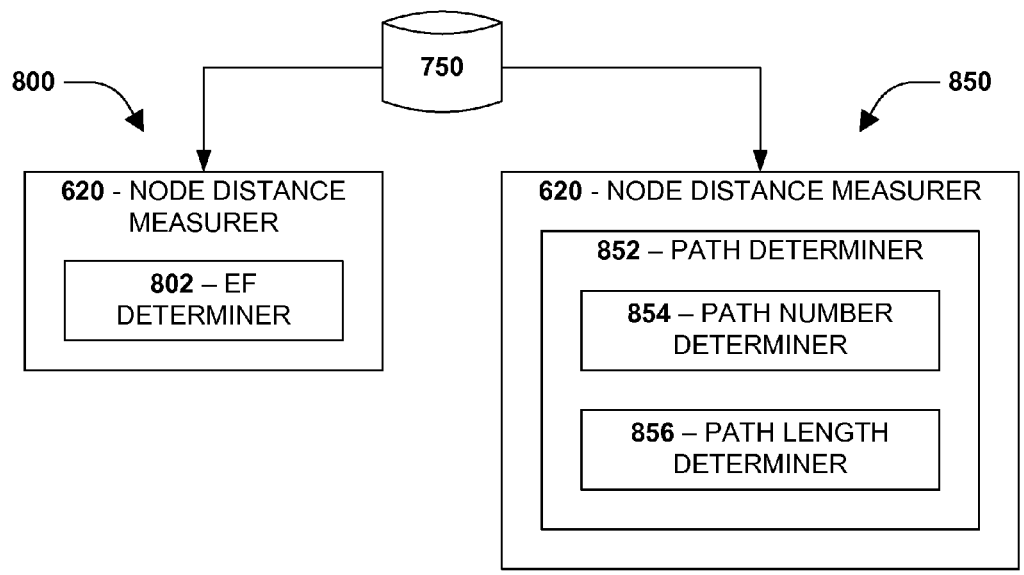
FIG. 8 illustrates two example embodiments of components used in the systems described herein.

FIG. 8 illustrates two exemplary embodiments 800 and 850 of a node distance measuring component 620 used in a system for efficiently computing a pairwise distance between nodes in a large graph. The node distance measuring component 620 in exemplary embodiment 800 comprises an effective resistance determiner 802 that is configured to compute an effective resistance between the two nodes using a hamming distance between the two nodes.

In this embodiment, for example, the node distance measuring component 620 can retrieve neighborhood sketches, for two nodes for which a distance can be determined, from the storage component 750. The effective resistance determiner 802, for example, can compute an effective resistance between the two nodes, which may equate to a number of paths between the nodes.

The node distance measuring component 620 in exemplary embodiment 850 comprises a path determiner 852 that is configured to compute an approximate path length and an approximate number of paths between two nodes. The path determiner 852 further comprises a path number determiner 854 and a path length determiner 856.

The path number determiner 854 is configured to determine an approximate number of paths between the two nodes, for example, by comparing a number of shared nodes between respective neighborhood sketches for the two nodes. In this example, the number of shared nodes between the neighborhood sketches of the two nodes of interest may indicate a number of paths between the nodes.

The path length determiner 856 is configured to determine a path length between the neighborhood-sketches of the two nodes for the approximate number of paths between the two nodes. For example, neighborhood sketches of distance (d) reference nodes for the respective nodes of interest having a same distance may be compared. A number (s) of share common nodes between the neighborhood sketches of distance reference nodes having a same distance can be determined, and it may be inferred that the nodes of interest share s paths of d distance (e.g., hops).

Figure 9:
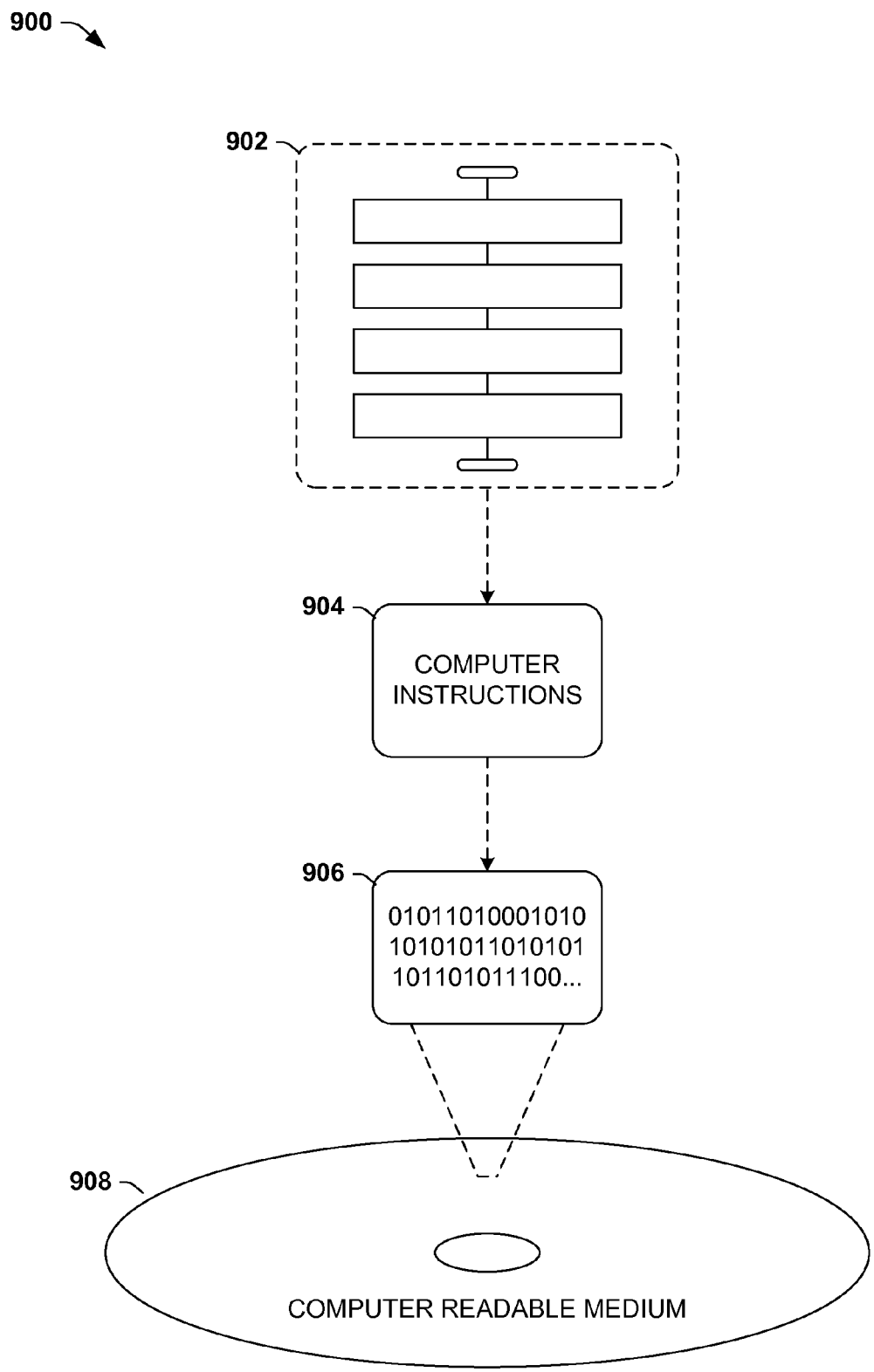
FIG. 9 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to one or more of the principles set forth herein. In one such embodiment 902, the processor-executable instructions 904 may be configured to perform a method, such as the exemplary method 100 of FIG. 1, for example. In another such embodiment, the processor-executable instructions 904 may be configured to implement a system, such as the exemplary system 600 of FIG. 6, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
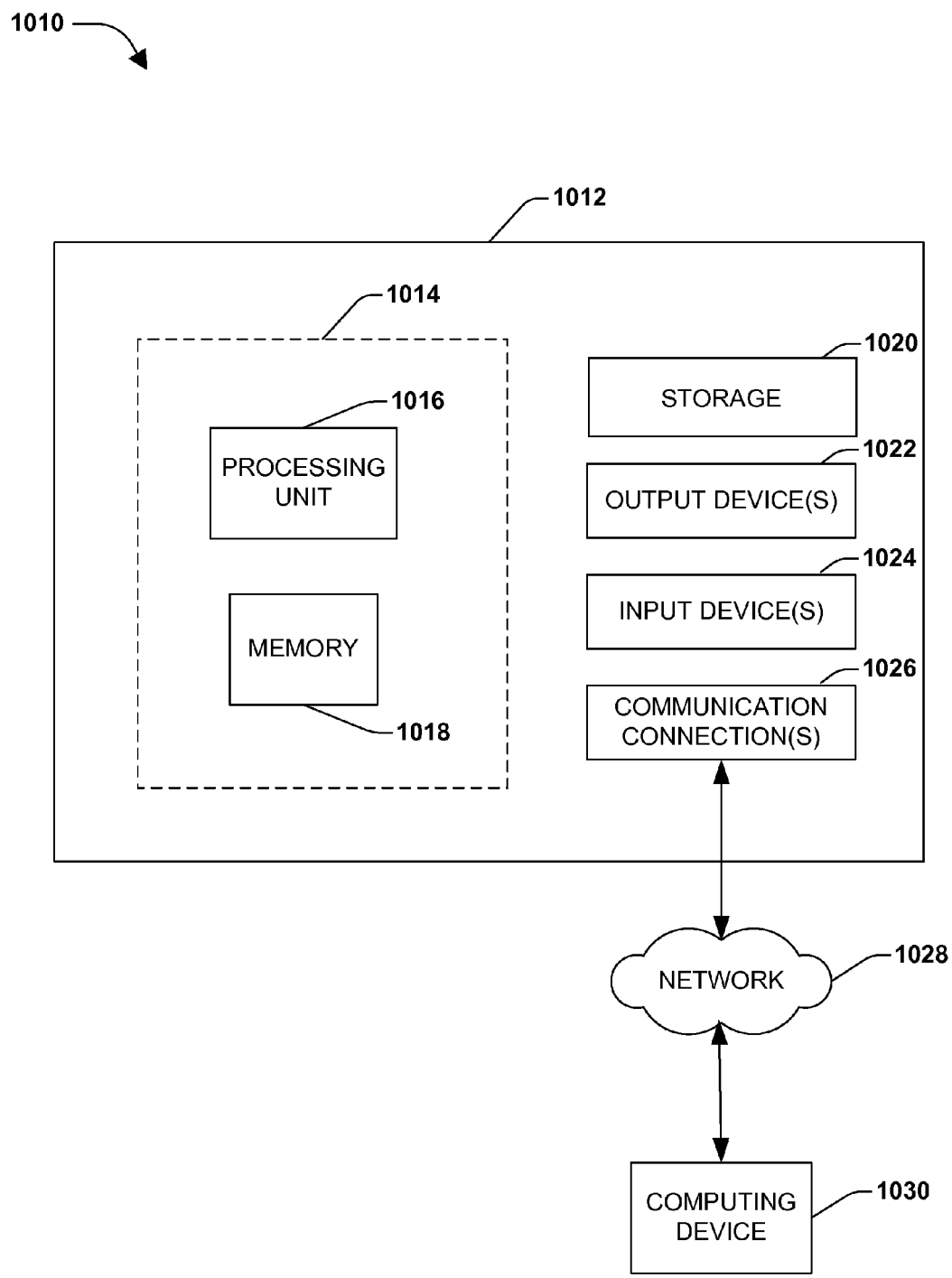
FIG. 10 illustrates an example computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1010 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
generating a URL-sketch for a node based on one or more node labels associated with the node and extracted from one or more other nodes;
generating a neighborhood-sketch for the node based on one or more neighboring node labels associated with one or more neighboring nodes specified within the URL-sketch for the node; and
determining a distance between the node and a second node based on the neighborhood-sketch, the determining comprising computing an approximate number of paths between the node and the second node.

2. The method of claim 1, the respective one or more node labels connecting at least one of the other nodes to the node.

3. The method of claim 1, the node comprising a web-page.

4. The method of claim 1, the computing based on one or more neighborhood-sketches associated with the second node.

5. The method of claim 1, the determining comprising:
computing an approximate path length of at least one path between the node and the second node.

6. The method of claim 1, the respective one or more neighboring node labels connecting a separate node to at least one of the neighboring nodes.

7. The method of claim 1, comprising storing a set of labels for the node for efficient storage and retrieval at least for generating the URL-sketch.

8. A computer readable storage medium, comprising instructions that when executed by a microprocessor perform a method, comprising:
generating a URL-sketch for a node based on one or more node labels associated with the node and extracted from one or more other nodes;
generating a neighborhood-sketch for the node based on one or more neighboring node labels associated with one or more neighboring nodes specified within the URL-sketch for the node; and
determining a distance between the node and a second node based on the neighborhood-sketch, the determining comprising computing an approximate number of paths between the node and the second node.

9. The computer readable storage medium of claim 8, the computing based on one or more neighborhood-sketches associated with the second node.

10. The computer readable storage medium of claim 8, the determining comprising computing an approximate path length of at least one path between the node and the second node.

11. The computer readable storage medium of claim 8, the computing an approximate number of paths comprising computing a number of common nodes comprised in the neighborhood-sketch for the node and in a second neighborhood-sketch for the second node.

12. The computer readable storage medium of claim 10, the computing an approximate path length comprising:
determining a first distance between a common node and the node in the neighborhood-sketch for the node; and
determining a second distance between the common node and the second node in a second neighborhood-sketch for the second node.

13. The computer readable storage medium of claim 8, the generating a neighborhood-sketch comprising determining a neighborhood for the node, comprising one or more of:
computing neighboring nodes using a random-surfer model starting from the node;
computing neighboring nodes using a node similarity bias walk model starting from the node; or
computing neighboring nodes using a breadth-first type graph exploration starting from the node.

14. The computer readable storage medium of claim 8, the determining a distance comprising:
computing an effective resistance between the node and the second node using a hamming distance between the node and the second node.

15. A system, comprising:
one or more processing units; and
memory comprising instructions that when executed by at least some of the one or more processing units implement at least some of the following:
a URL-sketch generating component configured to generate a URL-sketch for a node based on one or more node labels associated with the node and extracted from one or more other nodes;
a neighborhood-sketch generating component configured to generate a neighborhood-sketch for the node based on one or more neighboring node labels associated with one or more neighboring nodes specified within the URL-sketch for the node; and
a distance measuring component configured to determine a distance between the node and a second node based on the neighborhood-sketch,
the determining comprising computing an approximate number of paths between the node and the second node.

16. The system of claim 15, comprising a label set store component configured to store a set of labels for the node for efficient storage and retrieval at least for use by the URL-sketch generating component, the label set store component comprising a hash-table type storage component.

17. The system of claim 16, the label set store component configured to map the set of labels for the node into a bit-vector in hamming space.

18. The system of claim 15, comprising a node label extracting component configured to:
identify proxy-strings in a primary node that reference a link to a secondary node; and
associate a set of proxy-strings from one or more nodes to the secondary node.

19. The system of claim 15, the URL-sketch generating component configured to use minimal hashing of content of the node to generate the URL-sketch for the node.

20. The system of claim 15, the distance measuring component configured to:

compute an approximate path length of at least one path between the node and the second node.

* * * * *